United States Patent [19]  [11] 4,076,682
Theysohn et al.  [45] Feb. 28, 1978

[54] FLAMEPROOF NYLON MOLDING COMPOSITIONS

[75] Inventors: Rainer Theysohn, Ludwigshafen; Rolf Würmb, Heidelberg; Bernd Leutner, Frankenthal; Hans-Ulrich Schlimper, Speyer, all of Germany

[73] Assignee: BASF Aktiengesellschaft, Ludwigshafen, Germany

[21] Appl. No.: 722,518

[22] Filed: Sep. 13, 1976

[51] Int. Cl.² .......................... C08K 3/22; C08K 5/02
[52] U.S. Cl. ........................ 260/37 N; 260/45.75 W
[58] Field of Search ............... 260/45.75 W, 37 N; 106/296; 423/622

[56] References Cited

U.S. PATENT DOCUMENTS

| 3,022,185 | 2/1962 | Delfosse | 106/296 |
| 3,418,267 | 12/1968 | Busse | 260/45.75 C |
| 3,741,893 | 6/1973 | Mascioli et al. | 260/45.75 B |
| 3,810,861 | 5/1974 | Tacke et al. | 260/37 N |
| 3,908,068 | 9/1975 | MacKenzie et al. | 260/42.44 |

OTHER PUBLICATIONS

Advances in Fire Retardants – Part 2 – vol. 3, (1973), pp. 99 to 102, article by Schwarcz et al.

Primary Examiner—V. P. Hoke
Attorney, Agent, or Firm—Keil, Thompson & Shurtleff

[57] ABSTRACT

Thermoplastic molding compositions comprise a linear nylon, an adduct of hexachlorocyclopentadiene and a dienophile as a flameproofing agent, zinc oxide as a synergistic agent, and reinforcing fillers. The zinc oxide is manufactured by adding an aqueous solution of a zinc salt and an aqueous solution of a base to an aqueous suspension of an inorganic carrier, the zinc oxide being precipitated at a pH of from 10 to 12. The molding compositions can be processed to give flameproof moldings having good mechanical properties.

14 Claims, No Drawings

FLAMEPROOF NYLON MOLDING COMPOSITIONS

The present invention relates to filled nylon molding compositions which contain flameproofing agents to reduce their flammability.

The modification of nylon molding compositions by adding, for example, halogen-containing flameproofing agents together with a synergistic metal compound, has been disclosed. Thus, German Laid-Open Application DOS No. 1,694,494 discloses a process for flameproofing nylon with a halogen-containing organic flameproofing agent and zinc oxide. However, at least from 8 to 14% of zinc oxide is required if a 1.6 mm thick test specimen is to withstand a burning test. This is a disadvantage since such large amounts of this additive inter alia adversely affect the mechanical properties of the molding compositions. It is true that, according to German Laid-Open Application No. 2,141,036, the total amount of flameproofing agent and metal oxide can be reduced by adding salts of weak acids, eg. $CaCO_3$. However, even in that case the amounts of additives are of an order of magnitude which significantly detracts from the mechanical properties of the moldings manufactured from the composition.

It is an object of the present invention to avoid the disadvantages of the prior art.

We have found that this object is achieved by providing thermoplastic molding compositions consisting of a linear nylon, an organic flameproofing agent and synergistic metal compounds, as well as fillers and fibers, in which the synergistic metal compound is a zinc oxide which has been obtained in an aqueous suspension of an inorganic carrier by precipitating zinc oxide from an aqueous zinc salt solution, in the presence of caustic alkalis, at a pH of from 10 to 12, onto this carrier and separating the solids from the aqueous phase.

The zinc oxide to be used according to the invention is advantageously incorporated into the polymer together with the organic flameproofing agent and with a filler which increases the rigidity of the material, eg. glass fibers. As a result of the presence of the metal oxide provided by the invention, the requisite amount of metal oxide can be reduced to not more than half of the amount normally required. In addition it is also possible to reduce the normally employed amount of halogen-containing flameproofing agent by from 20 to 40%.

The zinc oxide which, according to the invention, is present in the molding compositions can be obtained by adding an aqueous solution of a base simultaneously with an aqueous solution of a zinc salt to an aqueous suspension of an inorganic carrier, under conditions such that a pH of from 10 to 12 is maintained in the suspension, and then separating the solids from the aqueous phase.

In an advantageous method of carrying out the process of the invention, an aqueous suspension of an inorganic carrier is first prepared at pH of from 10 to 12, and an aqueous zinc salt solution and an aqueous solution of a base are run into this suspension whilst maintaining the pH within the stated range.

Inorganic carriers which can be used are, in principle, all inorganic substances which have a negligible solubility in water within the pH range in question and which are compatible with nylons. Advantageously, the carriers should not be excessively hard and abrasive so as not to damage the processing equipment when being processed together with the plastics. Their hardness on the Mohs scale is advantageously not more than 6.

Examples of carriers which conform to the criterion of having a negligible solubility in water are silica, silicates and/or alkaline earth metal salts of carbonic acid, especially calcium carbonate in its various modifications. The mention of these substances does not imply any limitation of the applicability of the process, which in principle is applicable to any carrier which can be employed under the stated conditions. The carrier should advantageously have a particle size of from 0.1 to 100 $\mu$ and preferably from 1 to 20 $\mu$.

The concentration of carrier in the suspension is from 1 to 30% by weight, preferably from 5 to 15% by weight. Zinc salts which can be employed are all water-soluble, preferably inorganic, zinc compounds, eg. zinc chloride, zinc sulfate and/or preferably zinc nitrate. The concentration of zinc salt in the solutions employed is usually from 1 to 10 molar. It is at times advantageous, should this solution be turbid due to insoluble constituents, to add to the solution sufficient of the appropriate mineral acid to produce a clear solution, for example 20.5 $cm^3$ of 9% strength $HNO_3$ per liter of zinc nitrate solution, in the case of a 2.42 molar zinc nitrate solution.

The bases used are preferably alkali metal hydroxides, such as sodium hydroxide or potassium hydroxide, in the form of aqueous solutions. When these are employed, suitable concentrations are, in particular, from 10 to 50% by weight.

On adding the zinc salt solution to the alkaline suspension of the carrier, zinc hydroxide is first precipitated and this spontaneously decomposes, under the reaction conditions being maintained, to give zinc oxide and water, with the zinc oxide essentially precipitating on the surface of the carrier.

In order to ensure that the precipitation on the surface is as complete as possible, since this is a decisive factor in the quality of the desired product, the chosen rate of reaction should not be too high. For this reason it is advantageous to add the zinc salt solution at a rate of at most 0.003 mole/minute per g of carrier per liter of suspension. Toward the end of the precipitation on to the surface, it is advantageous to reduce the rate of addition of base somewhat, so that the pH falls to from 9 to 10, since this noticeably improves the filterability of the solid and the elutability of the nitrate. In general, this is the case when about 90% of the total zinc salt solution required have been added.

It is advantageous to allow the mixture to continue to react for from 10 to 60 minutes after all the reactants have been added. The solids are then separated from the liquid phase and dried.

The reaction can be carried out at room temperature (20° C) or at an elevated temperature, up to the boiling point of the suspension. It is advantageously carried out at elevated temperatures of from 30° to 80° C, preferably from 45° to 55° C.

The zinc salt is advantageously employed in such amounts, relative to the inorganic carrier, that after the precipitation the carrier is coated with from 30 to 60% by weight of zinc oxide.

Nylons which may be used for the purposes of the invention are, eg., linear polycondensates of lactams of 6 to 12 carbon atoms, or polycondensates of diamines and dicarboxylic acids. eg. nylon 6,6, 6,10 and 6,12. Nylon copolymers and nylon mixtures may also be used.

The K values of the nylons (measured by the method of H. Fikentscher, Cellulosechemie 13 (1932), 58, at 25° C, at a concentration of 0.5 g in 100 ml of 98% strength sulfuric acid) are suitably from 60 to 85, preferably from 65 to 75.

The inorganic fillers may be fibrous, flake-like or globular. Glass fibers are the preferred fibrous fillers; however, carbon fibers, asbestos fibers or potassium titanate fibers may also be used. The above all increase the strength and heat resistance of the molding compositions. The flake-like and globular fillers also improve the rigidity and increase the heat distortion point and furthermore result in isotropic shrinkage characteristics of the molding compositions. As such fillers, glass beads, chalk, kaolin, calcined kaolin, talc and mica may in particular be used. Some of these materials are at the same time suitable carriers for the zinc oxide.

The thermoplastic molding compositions suitably contain from 10 to 60% by weight, preferably from 10 to 40% by weight, of the fillers. These figures also include the inorganic carriers which act as fillers.

The glass fibers used for reinforcement may be employed in the form of chopped glass strands or of continuous glass rovings. They may be pretreated with the conventional sizes and adhesion promoters based on organosilanes, eg. $\gamma$-aminopropyltriethoxysilane. The mean length of the glass fibers in the mixture should advantageously be from 0.05 to 1 mm, preferably from 0.10 to 0.4 mm.

Advantageously, the glass fibers consist of so-called E-glass, but fibers of A-glass or C-glass may also be used.

The flameproofing agents are Diels-Alder products of hexachlorocyclopentadiene and a dienophile, eg. the Diels-Alder product of 2 moles of hexachlorocyclopentadiene and one mole of cyclooctadiene. The concentration is suitably from 4 to 15% by weight, preferably from 6 to 12% by weight, based on the molding composition. The zinc oxide content is suitably from 2 to 10% by weight, preferably from 3 to 6% by weight.

In addition to the additives mentioned, the molding compositions according to the invention may also contain the conventional stabilizers, processing assistants, lubricating agents, dyes and pigments. The additives may be incorporated into the plastics by conventional machinery, eg. extruders, mills or kneaders. At times it is advantageous to premix the additives or to prepare a concentrate of the additive in small amounts of the plastic and then to incorporate this into the main part of the plastic.

In the Examples, parts and percentages are by weight.

EXAMPLE 1

Manufacture of the Filler 8 g of sodium hydroxide (100% strength) are added to 1 liter of a suspension of calcium carbonate in water (100 g of $CaCO_3$/liter of suspension), whilst stirring, and the mixture is heated to 50° C. At this temperature, 505 $cm^3$ of a 2.42 molar zinc nitrate solution ( $\triangleq$100 g of ZnO) are added at the rate of 0.6 liter/hour (corresponding to 0.00024 mole per minute per gram of carrier per liter of suspension), until the pH has reached a value of from 11 to 11.5. NaOH solution is now added, to keep the pH constant at this value, until all the zinc nitrate solution, except for 50 $cm^3$, has been consumed. These 50 $cm^3$ are utilized to bring the pH to 10. The mixture is then stirred for a further 30 minutes, and the solid is filtered off and washed free from nitrate. After drying for 12 hours at 120° C, the analytical composition of the solid is as follows:

$CaCO_3$ (%): 50.0 $\pm$ 2.0;
ZnO (%): 50.0 $\pm$ 2.0;
nitrate (%): 0.1.

EXAMPLE 2

Manufacture of the Molding Compositions

Polycaprolactam having a K value of 72 is fused in a twin-screw extruder at about 270° C. Glass fibers and other additives are introduced through a downstream orifice as described in U.S. Pat. No. 3,304,282 or in "Kunststoffe", 49 (1959), 543. The amounts added are shown in Table 1. The percentages by weight are based on the end product. The mixture is extruded through a die, drawn off as a strand and granulated after cooling. Test specimens of size 1.5 $\times$ 13 $\times$ 130 mm are injection-molded from the granules. The flameproof properties are tested by a method based on the instruction of Underwriter's Laboratories, Bulletin No. 94, in which the vertically suspended test specimens are flamed for 10 seconds with a bunsen burner flame. The burning time was determined on groups of 10 test specimens at a time. The burning times shown in Table 2 are mean values per test bar; the tensile strength was tested in accordance with DIN 53,455.

TABLE 1

1. 18% of an adduct of 2 moles of hexachlorocyclopentadiene and 1 mole of cyclooctadiene, 12% of ZnO and 35% of glass fibers.

2. 11% of an adduct of 2 moles of hexachlorocyclopentadiene and 1 mole of cyclooctadiene, 7% of ZnO, 3% of $CaCO_3$ and 35% of glass fibers.

3. 8% of an adduct of 2 moles of hexachlorocyclopentadiene and 1 mole of cyclooctadiene, 4% of ZnO (deposited on $CaCO_3$, in the weight ratio of 1:1) and 35% of glass fibers.

TABLE 2

| Experiment | Metal oxide (%) | Additive (%) | Flameproofing agent (%) | Total amount of flameproofing material (%) | Mean burning time per test specimen (sec) | Tensile strength ($Nmm^{-2}$) |
|---|---|---|---|---|---|---|
| 1 | 12 ZnO | — | 18 | 30 | 11–13 | 118 |
| 2 | 7 ZnO | 3 $CaCO_3$ | 11 | 21 | 11 | 138 |
| 3 | 4 ZnO | — | 8 | 16 | 11 | 152 |

TABLE 2-continued

| Experiment | Metal oxide (%) | Additive (%) | Flameproofing agent (%) | Total amount of flameproofing material (%) | Mean burning time per test specimen (sec) | Tensile strength (Nmm$^{-2}$) |
|---|---|---|---|---|---|---|
| | (1:1 on CaCO$_3$) | | | | | |

It can be seen clearly that the molding compositions according to the invention, which have a substantially lower zinc oxide content and lower content of organic flameproofing agents, give — for the same burning times — significantly better strengths of the moldings than in the Comparative Experiments.

We claim:

1. A thermoplastic molding composition comprising a linear nylon, from about 4 to 20% by weight based on the molding composition of an addition produce of hexachlorocyclopentadiene and a dienophile as an organic flameproofing agent, from about 2 to 10% by weight, based on the molding composition of a synergistic metal compound and from about 10 to 60% by weight, based on the molding composition of an inorganic filler, wherein the synergistic metal compound is a zinc oxide which has been manufactured by adding an aqueous solution of a base simultaneously with an aqueous solution of a zinc salt to an aqueous suspension of an inorganic carrier in such a way as to maintain a pH of from 10 to 12 in the suspension, and then separating the solids from the aqueous phase.

2. A thermoplastic molding composition as claimed in claim 1, wherein the filler is glass fibers of mean length from 0.05 to 1 mm.

3. A thermoplastic molding composition as claimed in claim 1, wherein the flameproofing agent is a Diels-Alder addition product of 2 moles of hexachlorocyclopentadiene and 1 mole of cyclooctadiene.

4. A thermoplastic molding composition as claimed in claim 1, wherein the inorganic carrier is a virtually water-insoluble inorganic compound having a Mohs hardness of at most 6 and a mean particle size of from 0.1 to 100 μ.

5. A thermoplastic molding composition as claimed in claim 1, wherein the inorganic carrier is silica, a silicate or an alkaline earth metal carbonate.

6. A thermoplastic molding composition as claimed in claim 1, wherein the inorganic carrier is used in the form of an aqueous suspension of from 1 to 30% strength by weight.

7. A thermoplastic molding composition as claimed in claim 1, wherein zinc chloride, zinc sulfate or zinc nitrate is used as the zinc salt.

8. A thermoplastic molding composition as claimed in claim 1, wherein the zinc salt is used as an aqueous solution of molarity from 1 to 10.

9. A thermoplastic molding composition as claimed in claim 1, wherein an alkali metal hydroxide is used as the base.

10. A thermoplastic molding composition as claimed in claim 1, wherein the base is used in the form of an aqueous solution of from 10 to 50% strength by weight.

11. A thermoplastic molding composition as claimed in claim 1, wherein the ratio of the zinc salt to the carrier is so chosen that after precipitation the carrier is coated with from 30 to 60% by weight of zinc oxide.

12. A thermoplastic molding composition as claimed in claim 1, wherein the addition of the zinc salt solution to the carrier suspension is carried out at a rate of at most 0.003 mole of zinc per minute per g of carrier and per liter of suspension.

13. A thermoplastic molding composition as set forth in claim 1, wherein the inorganic carrier is calcium carbonate.

14. A thermoplastic molding composition as set forth in claim 1, wherein the nylon is nylon 6.

* * * * *